United States Patent
Niizuma

(10) Patent No.: US 9,752,340 B2
(45) Date of Patent: Sep. 5, 2017

(54) AUTOMATED PARKING FACILITY

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 314 days.

(21) Appl. No.: 14/627,413

(22) Filed: Feb. 20, 2015

(65) Prior Publication Data

US 2015/0167340 A1    Jun. 18, 2015

Related U.S. Application Data

(63) Continuation of application No. PCT/JP2013/069298, filed on Jul. 16, 2013.

(30) Foreign Application Priority Data

Aug. 24, 2012   (JP) .................................. 2012-185729

(51) Int. Cl.
*H02J 7/00* (2006.01)
*E04H 6/22* (2006.01)
(Continued)

(52) U.S. Cl.
CPC .............. *E04H 6/22* (2013.01); *B60L 11/182* (2013.01); *B60L 11/1829* (2013.01);
(Continued)

(58) Field of Classification Search
CPC ....... E04H 6/22; B60L 11/182; B60L 11/1829
(Continued)

(56) References Cited

U.S. PATENT DOCUMENTS 5,821,731 A * 10/1998 Kuki ................... B60L 11/1805
320/108
2014/0015312 A1* 1/2014 Niizuma ................... E04H 6/22
307/9.1

FOREIGN PATENT DOCUMENTS

CN      201953123 U    8/2011
CN      102535919 A    7/2012
(Continued)

OTHER PUBLICATIONS

International Search Report (in Japanese and English Languages), PCT/JP2013/069298, dated Oct. 8, 2013, 2 pgs.

*Primary Examiner* — Drew A Dunn
*Assistant Examiner* — Zixuan Zhou
(74) *Attorney, Agent, or Firm* — Volpe and Koenig, P.C.

(57) ABSTRACT

An automated parking facility conveying a vehicle to a storage space and storing it therein, includes: a power-transmitting coil provided in the storage space to perform wireless power transmission to a power-receiving coil of the vehicle; a vehicle support portion allowing the vehicle to be mounted thereon; a movable portion configured to move together with the vehicle support portion to a position facing the power-transmitting coil; an adjustment device configured to adjust the position of the vehicle support portion in the horizontal direction with respect to the movable portion; and a controller configured to control the adjustment device, and perform support portion positional adjustment in which the position of the vehicle support portion is adjusted with respect to the movable portion so that the power-receiving coil and the power-transmitting coil have a positional relationship suitable for the wireless power transmission.

10 Claims, 7 Drawing Sheets

(51) Int. Cl.
*B60L 11/18* (2006.01)
*E04H 6/34* (2006.01)
*H02J 7/02* (2016.01)
*H02J 17/00* (2006.01)
*E04H 6/42* (2006.01)
*H01M 10/46* (2006.01)

(52) U.S. Cl.
CPC .......... *B60L 11/1833* (2013.01); *E04H 6/225* (2013.01); *E04H 6/34* (2013.01); *E04H 6/42* (2013.01); *H02J 7/0027* (2013.01); *H02J 7/025* (2013.01); *H02J 17/00* (2013.01); *B60L 2230/16* (2013.01); *H01M 10/46* (2013.01); *Y02T 10/7005* (2013.01); *Y02T 10/7055* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
USPC .................................. 320/108, 109; 307/104
See application file for complete search history.

(56) References Cited

FOREIGN PATENT DOCUMENTS

| | | |
|---|---|---|
| EP | 0788212 A2 | 8/1997 |
| EP | 2330262 A2 | 6/2011 |
| EP | 2372046 A1 | 10/2011 |
| JP | 05-256038 A | 10/1993 |
| JP | 09-215211 A | 8/1997 |
| JP | 2009-225551 A | 10/2009 |
| JP | 2011-097814 A | 5/2011 |
| JP | 2013-055803 A | 3/2013 |
| WO | 2010/074128 A1 | 7/2010 |

\* cited by examiner

AUTOMATED PARKING FACILITY

This application is a Continuation Application based on International Application No. PCT/JP2013/069298, filed Jul. 16, 2013, which claims priority on Japanese Patent Application No. 2012-185729, filed Aug. 24, 2012, the contents of both of which are incorporated herein by reference.

TECHNICAL FIELD

The present invention relates to an automated parking facility.

BACKGROUND ART

In recent years, the use of vehicles equipped with an electric motor as a drive source instead of a combustion engine or together with the engine has increased in order to realize a low-carbon society. An electric vehicle (EV) is an example of a vehicle equipped with an electric motor instead of a combustion engine, and a hybrid vehicle (HV) is an example of a vehicle equipped with an electric motor together with a combustion engine. Such a vehicle includes a rechargeable battery (e.g., a secondary battery such as a lithium-ion battery or a nickel-hydrogen battery) which supplies electric power used for driving the electric motor thereto, and is configured to charge the battery using electric power supplied from an external power unit.

Most electric vehicles and hybrid vehicles (to be precise, plug-in hybrid vehicles) currently in practical use receive electric power used for charging the battery via a power-supplying cable which is attachable and removable for connecting the power unit and the vehicle. For example, Patent Document 1 discloses a technology in which electric power is transmitted via a power-supplying cable which is attachable and removable for connecting to a vehicle, in an automated parking facility which stores the vehicle in a storage space using a movable pallet. In contrast to such a technology, nowadays, as shown in Patent Document 2, a method is proposed in which a vehicle is supplied with electric power for charging a battery using a technology in which electric power is wirelessly from a power-transmitting coil to a power-receiving coil.

DOCUMENT OF RELATED ART

Patent Document

[Patent Document 1] Japanese Unexamined Patent Application, First Publication No. H5-256038
[Patent Document 2] Japanese Unexamined Patent Application, First Publication No. 2009-225551

SUMMARY OF INVENTION

Technical Problem

In the technology disclosed in Patent Document 1, since the attachment and removal of the power-supplying cable is necessary in order to supply electric power to the vehicle, the attachment and removal operations of the power-supplying cable are realized by a complex automatic apparatus or relying on human-intervention during the power supplying. Additionally, in the technology disclosed in Patent Document 1, since it is necessary to provide the power-supplying cable in the pallet, the wiring in the pallet is increased, and the installation and maintenance of the automated parking facility may require much time and effort. In the technology disclosed in Patent Document 2, if the relative positional relationship between the power-transmitting coil and the power-receiving coil deviates from the appropriate range, efficient transmission of electric power is difficult. Therefore, in a case where the technology of Patent Document 2 is applied to an automated parking facility, the wireless power transmission may not be efficiently performed due to variations in stop position of a vehicle on the pallet at the time of storing the vehicle.

The present invention is made in view of the above circumstances, and provides an automated parking facility having the following features:

(1) The attachment and removal of a power-supplying cable to and from a vehicle is unnecessary during the power supplying.

(2) The increase of the wiring in a pallet can be prevented.

(3) The wireless power transmission can be efficiently performed even if variations in the stop position of a vehicle occur at the time of storing the vehicle.

Solution to Problem

According to a first aspect of the present invention, an automated parking facility conveying a vehicle to a storage space and storing the vehicle in the storage space, the automated parking facility includes: a power-transmitting coil provided on a floor of the storage space, and performing wireless power transmission to a power-receiving coil provided on a bottom of the vehicle; a vehicle support portion allowing the vehicle to be mounted on the vehicle support portion; a movable portion supporting the vehicle support portion, configured to move together with the vehicle support portion to a position facing the power-transmitting coil in the storage space, and configured to stop at a position above the power-transmitting coil in the storage space; an adjustment device configured to adjust a position of the vehicle support portion in a horizontal direction with respect to the movable portion; and a controller controlling the adjustment device, and performing support portion positional adjustment in which the position of the vehicle support portion is adjusted with respect to the movable portion so that the power-receiving coil and the power-transmitting coil have a positional relationship suitable for the wireless power transmission.

According to a second aspect of the present invention, in the first aspect, the automated parking facility further includes a positional adjustment area allowing the movable portion together with the vehicle support portion to move to the positional adjustment area. The adjustment device is provided in the positional adjustment area. In addition, the controller performs the support portion positional adjustment when the movable portion and the vehicle support portion with the vehicle being mounted are located at the positional adjustment area, before the movable portion and the vehicle support portion move to the storage space.

According to a third aspect of the present invention, in the second aspect, the positional adjustment area is provided with a power-receiving coil detector detecting a position of the power-receiving coil. In addition, the controller performs the support portion positional adjustment based on a detection result of the power-receiving coil detector.

According to a fourth aspect of the present invention, in the second aspect, the controller returns the position of the vehicle support portion in the horizontal direction with respect to the movable portion to an original state by controlling the adjustment device, when the movable portion and the vehicle support portion are located at the positional adjustment area, before the vehicle is mounted on the vehicle support portion.

According to a fifth aspect of the present invention, in the second aspect, a second power-transmitting coil is provided on a floor of the positional adjustment area in order to perform wireless power transmission to the power-receiving coil. In addition, the controller performs the support portion positional adjustment based on a power-transmitting efficiency of the wireless power transmission between the power-receiving coil and the second power-transmitting coil when the movable portion and the vehicle support portion with the vehicle being mounted are located at the positional adjustment area.

According to a sixth aspect of the present invention, in the first aspect, the controller returns the position of the vehicle support portion in the horizontal direction with respect to the movable portion to an original state by controlling the adjustment device, before the vehicle is mounted on the vehicle support portion and the movable portion.

According to a seventh aspect of the present invention, in the first aspect, the controller performs the support portion positional adjustment based on a power-transmitting efficiency of the wireless power transmission between the power-receiving coil and the power-transmitting coil, when the movable portion and the vehicle support portion with the vehicle being mounted are located at the storage space.

According to an eighth aspect of the present invention, in the first aspect, the adjustment device includes a screw unit including a female screw portion and a male screw portion screwed to the female screw portion; and a drive device driving the screw unit. In addition, the female screw portion is provided in one of the vehicle support portion and the movable portion, and the male screw portion is rotatably provided in the other of the vehicle support portion and the movable portion.

According to a ninth aspect of the present invention, in the first aspect, each of the vehicle support portion and the movable portion includes a magnetic flux transparent portion allowing magnetic flux to penetrate through the magnetic flux transparent portion, wherein the magnetic flux is between the power-receiving coil and the power-transmitting coil during the wireless power transmission.

According to a tenth aspect of the present invention, in the ninth aspect, size in the horizontal direction of the magnetic flux transparent portion of the vehicle support portion is set to be greater than size in the horizontal direction of the power-receiving coil.

Effects of Invention

According to the present invention, since electric power is wirelessly supplied to a vehicle, attachment and removal of a power-supplying cable to and from the vehicle is unnecessary for the power supplying. According to the present invention, the increase of the wiring of the pallet due to the arrangement of a power-supplying cable on the pallet can be prevented. In addition, according to the present invention, the relative positional relationship between the vehicle support portion and the movable portion in the horizontal direction can be adjusted, and the position of the vehicle support portion disposed above the power-transmitting coil can be adjusted so that the power-receiving coil of the vehicle and the power-transmitting coil of the storage space face each other. Therefore, the wireless power transmission can be efficiently performed even if the vehicle stops on the vehicle support portion with a positional misalignment at the time of entering the automated parking facility.

DESCRIPTION OF EMBODIMENTS

Figure 1A:
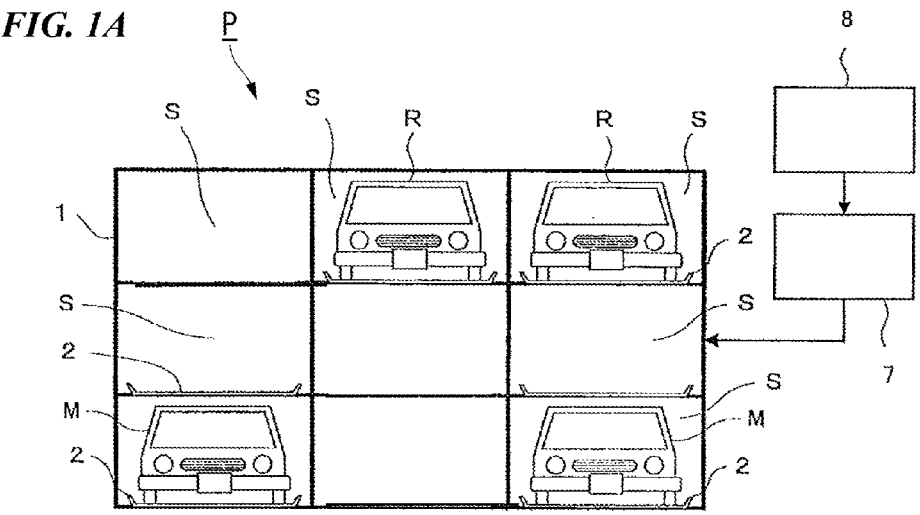
FIG. 1A is a front view of an automated parking facility of an embodiment of the present invention.

Hereinafter, an embodiment of the present invention is described with reference to the drawings.

As shown in FIGS. 1A through 4B, an automated parking facility P of this embodiment includes a vehicle storage rack 1, a pallet 2, a ball screw unit 3 (a screw unit, an adjustment device), a motor 4 (a drive device, an adjustment device), a power-receiving coil detector 5, a power-transmitting coil 6, a control device 7 (a controller), and an operation device 8. The automated parking facility P conveys a vehicle M to a storage space S and stores the vehicle M in the storage space S. The motor 4 corresponds to a drive device of the present invention. The ball screw unit 3 and the motor 4 correspond to an adjustment device of the present invention.

Figure 1B:
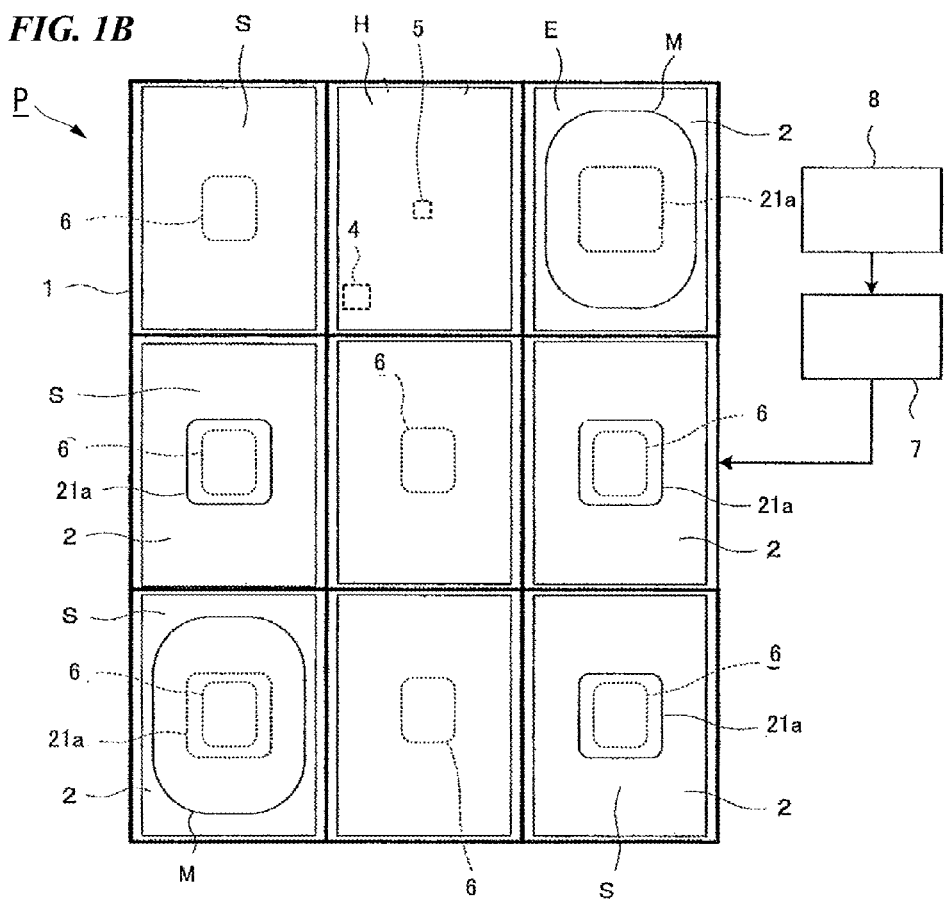
FIG. 1B is a top view of the automated parking facility.

As shown in FIGS. 1A and 1B, the vehicle storage rack 1 contains a plurality of vehicle spaces (a total of twenty-seven spaces) arranged in three rows in the back-and-forth direction, in three columns in the right-and-left direction, and in three levels in the up-and-down direction. One space of the spaces is set as an entrance area E (e.g., the space positioned at upper-right in FIG. 1B). Another space adjacent to the entrance area E is set as a positional adjustment area H. The other twenty-five spaces are set as storage spaces S. The entrance area E is a space provided with an entrance gate to the automated parking facility at which the vehicle M moving from the entrance gate stops.

The positional adjustment area H is a space which is arranged to be adjacent to the entrance area E and is for performing positional adjustment (support portion positional adjustment) of the vehicle M which has moved into the automated parking facility and has been mounted on the pallet 2. The storage spaces S are spaces in which the vehicle M conveyed by the pallet 2 is stored. The pallets 2 are stored in parts of these spaces. The total number of the pallets 2 is set to be less than the total number of the vehicle spaces of the vehicle storage rack 1 in order that the pallets 2 are movable inside the automated parking facility P. The number of the spaces in the vehicle storage rack 1 is assumed to be twenty-seven for convenience of description, but the number of spaces may be greater than or less than twenty-seven, and the arrangement of spaces (the shape of the vehicle storage rack 1) may be a shape other than a cuboid.

Figure 2A:
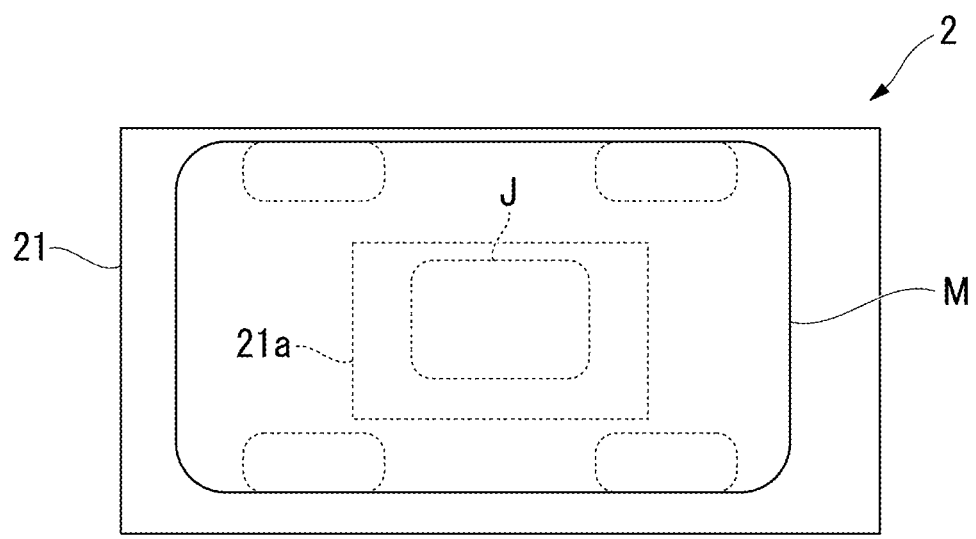
FIG. 2A is a plan view of a pallet of the embodiment of the present invention.
Figure 2B:
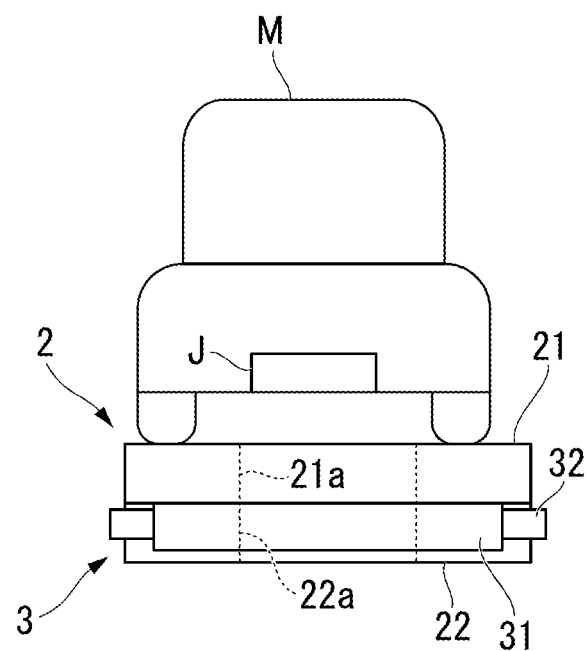
FIG. 2B is a front view of the pallet and a ball screw unit of the embodiment of the present invention.
Figure 2C:
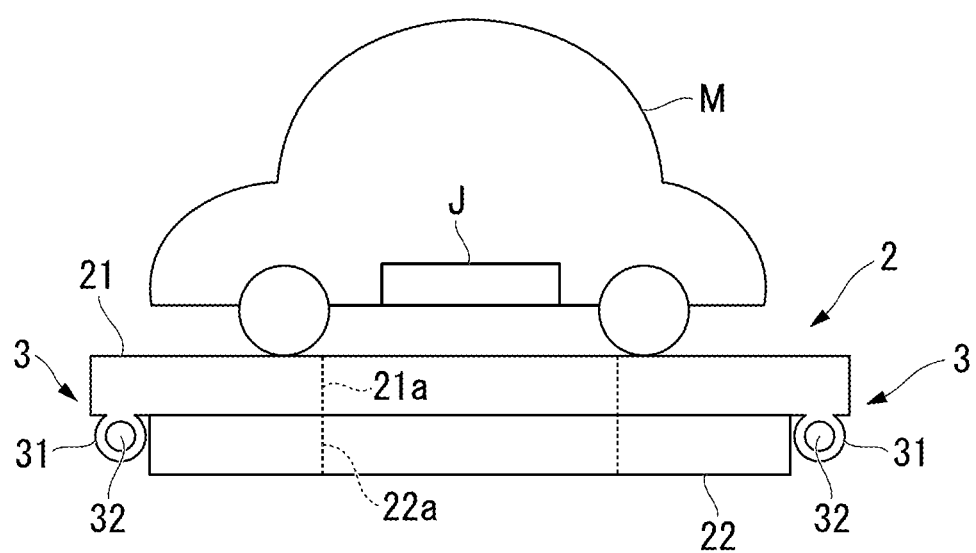
FIG. 2C is a side view of the pallet and the ball screw unit.

The pallet 2 includes a vehicle support member 21 (vehicle support portion) on which the vehicle is mounted, and a restriction member 22 (movable portion) arranged under the vehicle support member 21. The vehicle support member 21 is a rectangular metal plate and is formed to be smaller than each space (each of the entrance area E, the positional adjustment area H and the storage spaces S) of the vehicle storage rack 1 in size. As described below, even when the relative position of the vehicle support member 21 to the restriction member 22 is moved to be maximum using the adjustment device (the ball screw unit 3 and the motor 4), the vehicle support member 21 can be kept to be inside each space because the vehicle support member 21 is formed to be smaller than each space in size. An opening 21a (magnetic flux transparent (transmissive) portion) is formed in the central region of the vehicle support member 21. As shown in FIGS. 2A through 2C, the opening 21a is provided in a position facing a power-receiving coil J provided on the bottom of the vehicle M, and is formed to be larger than the power-receiving coil J in size in the horizontal direction.

The opening 21a is provided in the vehicle support member 21 mainly in order not to block the magnetic field emitted from the power-transmitting coil 6. Even if the vehicle M is mounted on the pallet 2 with a positional misalignment, the magnetic field can always pass through the opening 21a, and the wireless power transmission to the power-receiving coil J can be efficiently performed, because the opening 21a is formed to be larger than the power-receiving coil J in size. In the vehicle support member 21, the opening 21a may be filled with a magnetic field transparent material such as a resin which does not block the magnetic field, for example, in order to increase the mechanical strength of the vehicle support member 21. A side of the pair of short edges of the vehicle support member 21 is provided with a female screw portion 31 (described below) of the ball screw unit 3 along each short edge.

The restriction member 22 is a rectangular metal plate having a size which can be accommodated in each space (each of the entrance area E, the positional adjustment area H and the storage spaces S) of the vehicle storage rack 1, and is disposed being overlapped with the vehicle support member 21 under the vehicle support member 21. An opening 22a (magnetic flux transparent portion) is formed in the central region of the restriction member 22. The opening 22a is provided in a position facing the power-transmitting coil 6 provided on a floor s1 of the storage space S when the restriction member 22 is positioned inside the storage space S. The opening 22a is formed to be slightly larger than the power-transmitting coil 6 in size in the horizontal direction. That is, a portion of the restriction member 22 facing the power-transmitting coil 6 has the magnetic field transmissibility. Since the opening 22a is formed to be slightly larger than the power-transmitting coil 6 in size, the magnetic field emitted by the power-transmitting coil 6 can pass through the opening 22a without being blocked by the restriction member 22 during the wireless power transmission, and the power supplying can be efficiently performed.

The restriction member 22 in this embodiment supports the vehicle support member 21 from the lower side thereof. However, the present invention is not limited to this configuration, and the restriction member 22 may support the vehicle support member 21 from the upper side or from a lateral side thereof without interfering move of the vehicle M (during moving into or out of the automated parking facility). The restriction member 22 together with the vehicle support member 21 can move to a position facing the power-transmitting coil 6 in the storage space S.

The opening 22a is provided in the restriction member 22 mainly in order not to block the magnetic field emitted from the power-transmitting coil 6. In the restriction member 22, the opening 22a may be filled with a magnetic field transparent material such as a resin which does not block the magnetic field in order to increase the mechanical strength of the restriction member 22, similarly to the vehicle support member 21. A male screw portion 32 (described below) of the ball screw unit 3 is rotatably attached to a side of the pair of short edges of the restriction member 22 along each short edge via a bearing or the like (not shown). In FIGS. 2B and 2C, a structure used for attaching the male screw portion 32 to the restriction member 22 is omitted.

The vehicle support member 21 and the restriction member 22 are connected to each other by screwing the male screw portion 32 to the female screw portion 31 of the ball screw unit 3. The vehicle support member 21 and the restriction member 22 move backward and forward in the horizontal direction, rightward and leftward in the horizontal direction, and upward and downward, driven by a pallet conveyance device (not shown) controlled by the control device 7, and stop at one of the spaces (the entrance area E, the positional adjustment area H and the storage spaces S) of the vehicle storage rack 1. In general, the pallet conveyance device is connected only to the restriction member 22. During the movement of the restriction member 22 to the storage space S, the restriction member 22 is stopped (located) at a predetermined position above the power-transmitting coil 6 by contacting a wall or the like (a locating portion) of the storage space S. During the movement of the restriction member 22 to the entrance area E or to the positional adjustment area H, the pallet 2 (the restriction member 22) is stopped (located) at a predetermined position inside each area by contacting a wall or the like (a locating portion) of each area. The locating portion of the storage space S or the like is not limited to the wall or the like, and may be a stopper or the like provided in the storage space S or the like. The locating of the restriction member 22 may be performed using a sensor such as a light sensor or a magnetic sensor. In a case where the light sensor is employed, a light emitter which emits light, or a reflector (a mirror, a silver-colored tape or the like) which reflects the light emitted from the light sensor back into the light sensor may be used together as a sensing target. In a case where the magnetic sensor is employed, a magnet or the like may be used together as a sensing target. The above sensor is provided in either the restriction member 22 or each space, namely, the storage spaces S, the entrance area E and the positional adjustment area H. The sensing target is provided in the other of the restriction member 22 and each space, namely, the storage spaces S the entrance area E and the positional adjustment area H.

In an example of employing a light sensor, a strip-shaped reflector is fixed on the surface of the restriction member 22, and a light sensor is arranged in the storage space S so as to have a positional relationship with the reflector, in which the light emitted from the light emitter is reflected by the reflector and is incident on the light sensor only when the restriction member 22 is located at a predetermined position in the area, and the light reflected by the reflector is not incident on the light sensor when the restriction member 22 is located at the other positions. When the automated parking facility is configured so that the pallet conveyance device operates while the light sensor does not detect the light and so that the pallet conveyance device stops operating if the light sensor detects the light, the restriction member 22 can stop (be located) at a predetermined position above the power-transmitting coil 6 without contacting the wall or the like of the storage space S during the movement of the restriction member 22 to the storage space S.

It is preferable that the ball screw unit 3 includes a screw having an appropriately narrow pitch. In this configuration, when the pallet 2 moves backward and forward in the horizontal direction, rightward and leftward in the horizontal direction, and upward and downward, the rotation of the male screw portion 32 can be prevented even if a force is added to the ball screw unit 3 in the axial direction of the ball screw unit 3 (in the direction along the short edge of the pallet 2 in this embodiment). Thus, it is possible to prevent the relative position between the vehicle support member 21 and the restriction member 22 from unexpectedly changing at the time other than the positional adjustment at the positional adjustment area H or the like.

The vehicle M is mounted on the vehicle support member 21 as shown in the drawings. The vehicle M, being a target to which the automated parking facility P supplies electric power, includes a hybrid vehicle driven by a combustion engine and by an electric motor, or an electric vehicle driven by an electric motor. That is, the target of power supply is a vehicle in which electric power that the power-receiving coil J wirelessly receives from the power-transmitting coil 6 is stored in a battery, and electric power stored in the battery feeds the driving electric motor. In contrast, the target of power supply does not cover a normal vehicle R not including a power-receiving circuit, a battery and the like, and driven only by a combustion engine.

The power-receiving coil J is a helical coil having a predetermined coil diameter and is provided on the bottom of the vehicle M so that the coil axis is in the vertical direction. Both ends of the power-receiving coil J are connected to input terminals of a power-receiving circuit (not shown), and the power-receiving coil J is electromagnetically coupled to the power-transmitting coil 6 (described below) and wirelessly receives AC power. The power-receiving circuit includes a resonance capacitor, and the resonance capacitor together with the power-receiving coil J composes a power-receiving-side resonance circuit. The power-receiving circuit is a rectifier circuit which converts the AC power from the power-receiving coil J into DC power and which supplies the DC power to the battery. The capacitance of the resonance capacitor of the power-receiving circuit is set so that the resonance frequency of a power-supplying-side resonance circuit (described below) and the resonance frequency of the power-receiving-side resonance circuit are the same frequency.

As shown in FIGS. 2B and 2C, the ball screw unit 3 includes the female screw portion 31 and the bar-shaped male screw portion 32. Female screw grooves are formed in the female screw portion 31, and male screw grooves screwed to the female screw portion 31 are formed on the circumferential surface of the male screw portion 32. The female screw portion 31 is fixed to a side of the pair of short edges of the vehicle support member 21 along each short edge. The male screw portion 32 is rotatably provided on a side of the pair of short edges of the restriction member 22 via a bearing or the like (not shown) along each short edge.

In the ball screw unit 3, when the vehicle support member 21 and the restriction member 22 have moved to the positional adjustment area H, the male screw portion 32 is connected to the motor 4 via gears or the like (not shown), and rotates being driven by the motor 4. Since the female screw portion 31 fixed to the vehicle support member 21 cannot rotate, the vehicle support member 21, to which the female screw portion 31 is fixed, moves in the width direction thereof (the horizontal direction) with respect to the restriction member 22 in accordance with the rotation of the male screw portion 32. That is, the ball screw unit 3 adjusts the relative positional relationship between the vehicle support member 21 and the restriction member 22 in the width direction. When the vehicle support member 21 and the restriction member 22 are located other than the positional adjustment area H, the connection between the male screw portion 32 and the motor 4 is released, and thus the pallet 2 can move without being held by the motor 4. Specifically, for example, the end surface of the male screw portion 32 and the end surface of a shaft face each other, and the both end surfaces are planar and formed of a material having a large friction coefficient, wherein the shaft is driven by the motor 4 via gears or the like (not shown). In this case, when the vehicle support member 21 and the restriction member 22 have moved to the positional adjustment area H, the end surface of the male screw portion 32 is pushed against the end surface of the shaft, and thereby the male screw portion 32 can be connected to the motor 4. Accordingly, the male screw portion 32 can rotate in synchronization with the rotation of the motor 4.

Figure 3A:
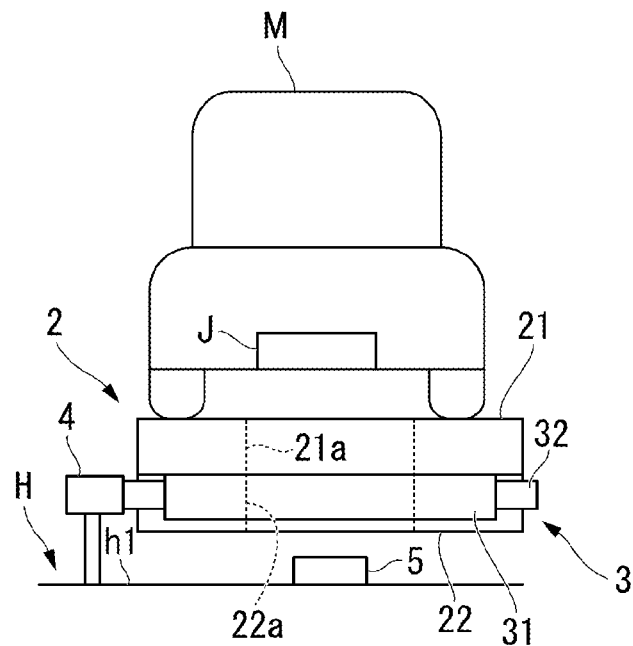
FIG. 3A is a front view showing a positional adjustment area of the embodiment of the present invention.

As shown in FIG. 3A, the motor 4 is provided in the positional adjustment area H. The motor 4 is connected to the male screw portion 32 via gears or the like (not shown), and rotates based on motor drive signals input from the control device 7, thereby rotating the male screw portion 32.

In a case where the ball screw unit 3 has a large speed reduction ratio and the motor 4 can generate large torque, the rotary shaft of the motor 4 may be directly connected to the male screw portion 32 without gears or the like.

Figure 3B:
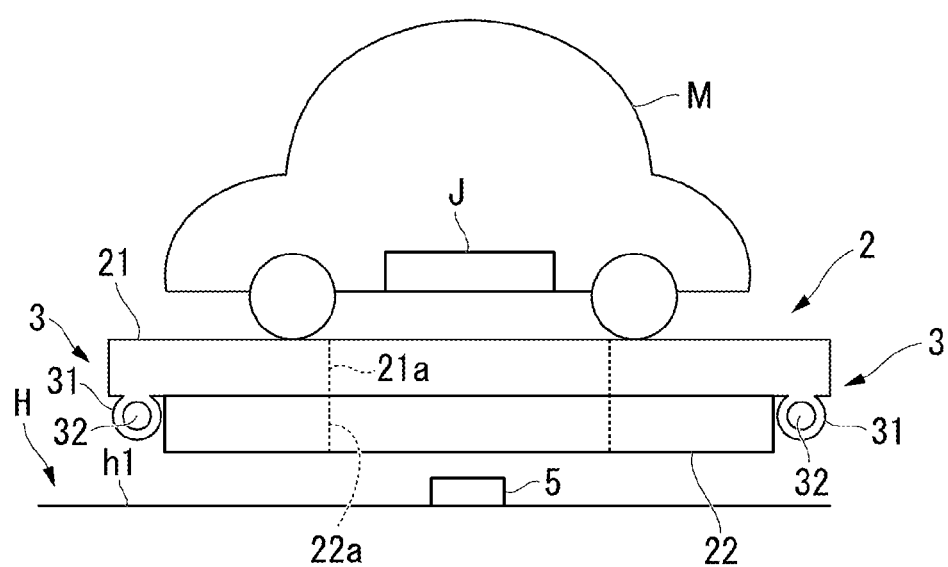
FIG. 3B is a side view showing the positional adjustment area.
Figure 4A:
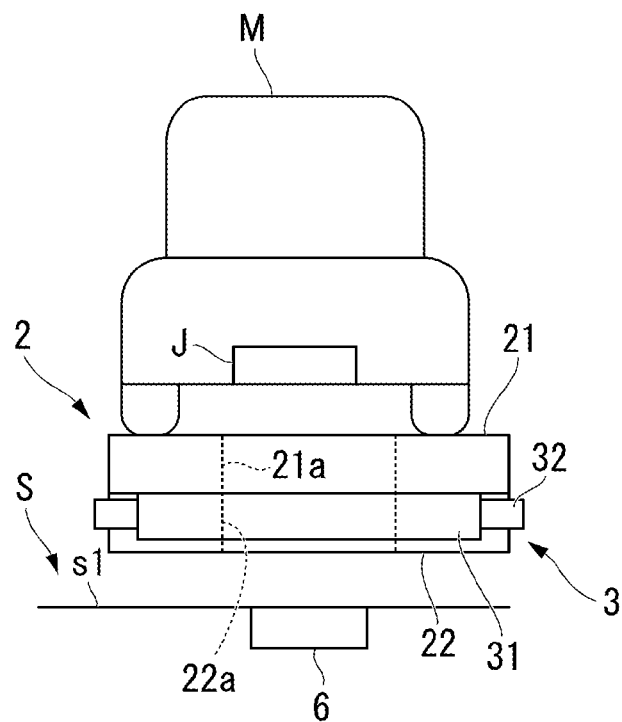
FIG. 4A is a front view showing a storage space of the embodiment of the present invention.
Figure 4B:
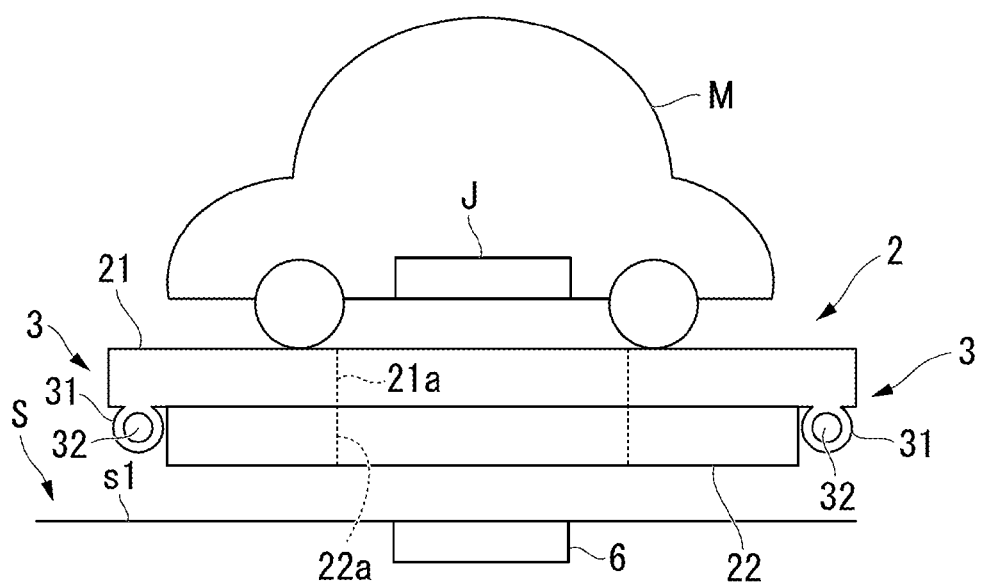
FIG. 4B is a side view of the storage space.

As shown in FIGS. 3A and 3B, the power-receiving coil detector 5 is provided in the positional adjustment area H (e.g., on a floor h1 thereof), and detects the position of the power-receiving coil J of the vehicle M mounted on the pallet 2. For example, the power-receiving coil detector 5 is an imager which images the power-receiving coil J having a mark or the like which is provided in a predetermined position thereof, or is a light sensor which detects light of a light emitter such as an LED (light emitting diode) provided on the power-receiving coil J. The power-receiving coil detector 5 outputs, to the control device 7, detection data (detection result) showing the detection result of taken images or of light, or the like. The control device 7 determines the position (position in the horizontal direction) of the power-receiving coil J of the vehicle M on the pallet 2 based on the detection data input from the power-receiving coil detector 5. It is to be noted that the mark or the like may be provided in a position different from that of the power-receiving coil J (for example, in the vicinity of the power-receiving coil J of the vehicle M). In this case, the position of the power-receiving coil J is calculated using the detected position of the mark or the like.

The power-transmitting coil 6 is a helical coil having a predetermined coil diameter. The power-transmitting coil 6 is provided on the floor s1 of the storage space S so as to have an attitude in which the coil axis of the power-transmitting coil 6 is in the up-and-down direction (the vertical direction) and so as to face the opening 22a of the restriction member 22 which has been conveyed into the storage space S. The power-transmitting coil 6 is arranged on the floor s1, and may be exposed or may be covered by a non-magnetic material such as plastic. The power-transmitting coil 6 has approximately the same coil diameter as that of the power-receiving coil J, and both ends of the power-transmitting coil 6 are connected to output terminals of a power-supplying circuit (not shown). High frequency AC power is supplied from the power-supplying circuit to the power-transmitting coil 6, and thereby the power-transmitting coil 6 generates a magnetic field. The vehicle M can be wirelessly supplied with electric power through the magnetic field. The power-supplying circuit includes a resonance capacitor and the resonance capacitor together with the power-transmitting coil 6 composes the power-supplying-side resonance circuit. The power-supplying circuit is an inverter which converts the input DC power into AC power (high frequency AC power) and which supplies the AC power to the power-transmitting coil 6.

The control device 7 controls the entire automated parking facility P. The control device 7 is electrically connected to various objects to be controlled which include the power-supplying circuit (not shown) and to the operation device 8. The control device 7 comprehensively controls the various objects to be controlled based on, for example, control programs stored in non-volatile storages provided therein, and on operating instruction information input from the operation device 8.

The operation device 8 is an input device into which a manager, who manages and operates the automated parking facility P, manually inputs operating instructions, and is, for example, an operation panel including hardware keys, or is a touch panel. The operating instructions manually input into the operation device 8 through the operation of the manager are sent as the operating instruction information, from the operation device 8 to the control device 7. The operation device 8 is provided with, for example, a manual operation button (storage instruction button) in order to instruct the automated parking facility to store the vehicle M positioned at the entrance area E. When the manual operation button is pressed, the control device 7 starts movement of the pallet 2 (the restriction member 22) in the entrance area E on which the vehicle M is mounted.

Next, the operation of the automated parking facility P having the above configuration is described in detail with reference to FIGS. 5A through 5G.

Figure 5A:
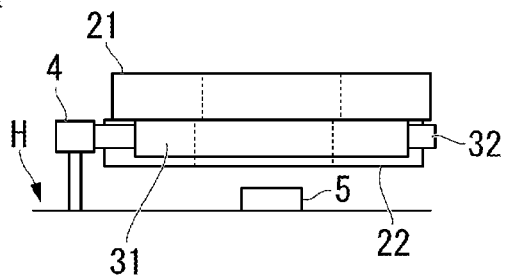
FIG. 5A is a schematic view showing a first step of the operation of the automated parking facility.

In the automated parking facility P, the control device 7 moves the pallet 2 to the positional adjustment area H, before moving the pallet 2 to the entrance area E (refer to FIG. 5A).

Figure 5B:
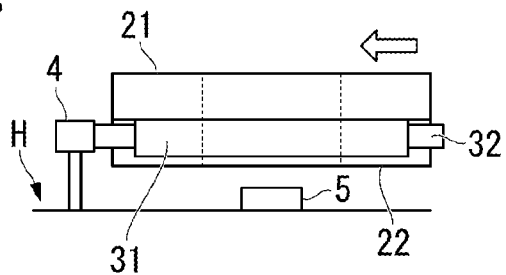
FIG. 5B is a schematic view showing a second step of the operation of the automated parking facility.

Next, the control device 7 makes the motor 4 rotate the male screw portion 32 after the motor 4 and the male screw portion 32 are connected to each other, thereby returning the relative positional relationship in the width direction between the vehicle support member 21 and the restriction member 22 to the original state thereof (a state having no positional misalignment therebetween, for example, the center positions of the vehicle support member 21 and of the restriction member 22 in the width direction are the same in the horizontal direction) (refer to FIG. 5B). It is to be noted that this step may be performed in an area other than the positional adjustment area H in a case where a drive device is provided in the pallet 2 in order to perform the relative positional adjustment between the vehicle support member 21 and the restriction member 22.

Figure 5C:
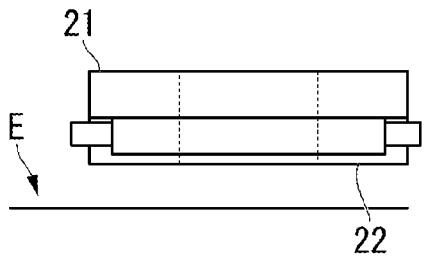
FIG. 5C is a schematic view showing a third step of the operation of the automated parking facility.

Thereafter, the control device 7 moves the pallet 2 to the entrance area E (refer to FIG 5C).

Figure 5D:
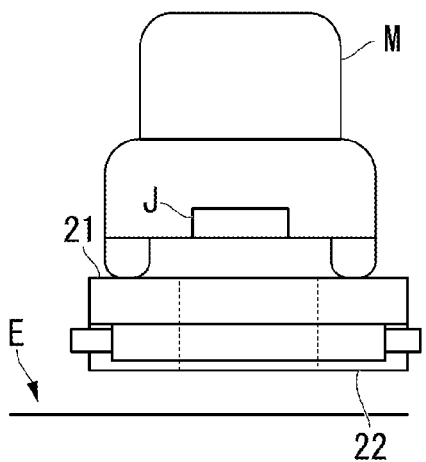
FIG. 5D is a schematic view showing a fourth step of the operation of the automated parking facility.

In order to store the vehicle M in the automated parking facility P, for example, the vehicle M is operated by a driver thereof, and thereby is mounted on the pallet 2 in the entrance area E provided with the entrance gate (refer to FIG. 5D). The manager presses the storage instruction button of the operation device 8 of the automated parking facility P, thereby outputting storage instructions to the control device 7. At the time of storing the vehicle M, if the manager receives the charging request for the battery of the vehicle M from the driver, the manager presses a charging instruction button in addition to the storage instruction button, thereby outputting charging instructions to the control device 7.

Figure 5E:
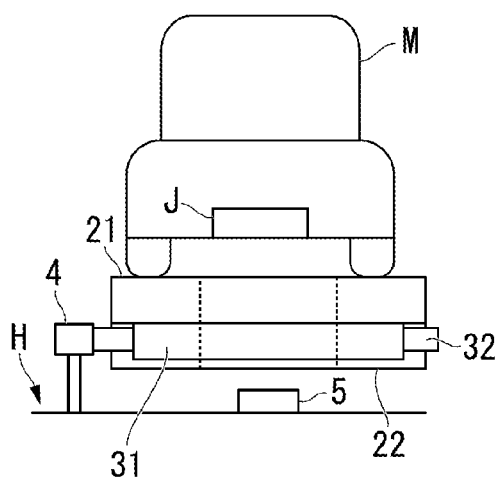
FIG. 5E is a schematic view showing a fifth step of the operation of the automated parking facility.
Figure 5F:
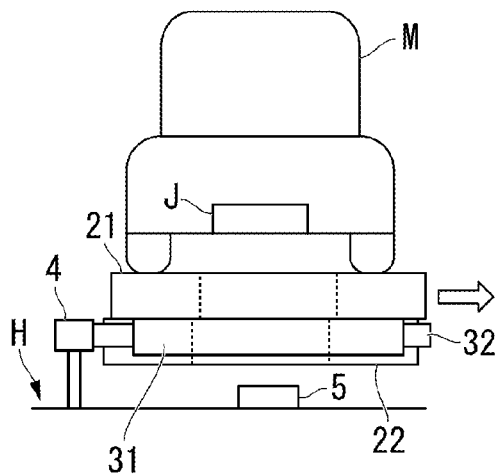
FIG. 5F is a schematic view showing a sixth step of the operation of the automated parking facility.
Figure 5G:
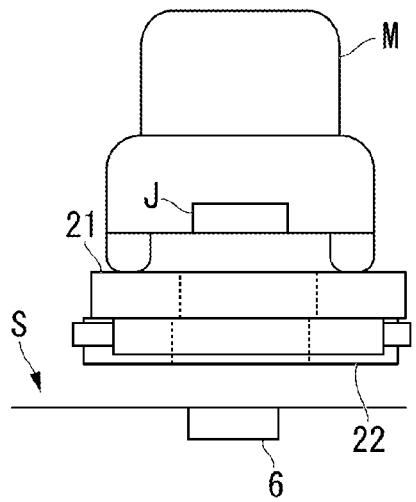
FIG. 5G is a schematic view showing a seventh step of the operation of the automated parking facility.

When the storage instructions and the charging instructions are input from the operation device 8 into the control device 7, the control device 7 of the automated parking facility P moves, from the entrance area E to the positional adjustment area H, the pallet 2 on which the vehicle M is mounted (refer to FIG. 5E). Subsequently, the control device 7 determines the position of the power-receiving coil J of the vehicle M on the pallet 2 based on the detection data input from the power-receiving coil detector 5 provided in the positional adjustment area H. The control device 7 makes the motor 4 rotate the male screw portion 32 based on the detection result by the power-receiving coil detector 5, that is, the positional information of the power-receiving coil J. Accordingly, the vehicle support member 21 with the vehicle M being mounted thereon moves in the width direction (the horizontal direction) with respect to the restriction member 22, and the position of the vehicle M is adjusted so that the power-receiving coil J faces the power-transmitting coil 6 in the storage space S (refer to FIG. 5F, support portion positional adjustment). That is, the positional misalignment between the power-receiving coil J and the power-transmitting coil 6 in the width direction of the pallet 2 is decreased. It is sufficient to perform the positional adjustment of the vehicle support member 21 with respect to the restriction member 22 using the control device 7 so that the power-receiving coil J and the power-transmitting coil 6 have a positional relationship suitable for the wireless power transmission when the vehicle M is conveyed to the storage space S. For example, the control of the control device 7 is performed so that the positional misalignment in the horizontal direction between the power-receiving coil J and the power-transmitting coil 6 is less than a predetermined threshold value. This threshold value is determined based on the power transmission efficiency or the like in the wireless power transmission.

With respect to a positional misalignment between the power-receiving coil J and the power-transmitting coil 6 in the length direction of the pallet 2, it is sufficient for the driver to stop the vehicle M within the range of the positional misalignment in which no performance degradation occurs in the wireless power transmission when the vehicle M is mounted on the pallet 2 in the entrance area E. After the positional adjustment of the vehicle M is finished, the control device 7 moves, to the storage space S, the pallet 2 on which the vehicle M is mounted (refer to FIG. 5G).

In the example shown in FIGS. 5A through 5G, the vehicle M is mounted on the pallet 2 in the entrance area E with deviation to the left in FIG. 5D with respect to the vehicle support member 21 and the restriction member 22. However, after the positional adjustment at the positional adjustment area H through the above-described steps, the vehicle M is positioned right above the restriction member 22 in FIG. 5F. Thereafter, the pallet 2 on which the vehicle M is mounted moves to the storage space S, and the restriction member 22 stops at the position right above the power-transmitting coil 6. At this time, the vehicle M is also located right above the power-transmitting coil 6. Therefore, the power-receiving coil J is arranged at the position right above the power-transmitting coil 6, that is, at the position in which the wireless power transmission is most efficient (refer to FIG. 5G).

In the above descriptions and drawings, a configuration is described in which the power-transmitting coil 6 and the power-receiving coil J are located at the centers (centers in the horizontal direction) of the storage space S and of the vehicle M, respectively. However, if the power-transmitting coil 6 and the power-receiving coil J can be arranged so as to face each other, they may be provided in locations other than the centers. Additionally, in this embodiment, the restriction member 22 stops at the location right above the power-transmitting coil 6. However, if the power-transmitting coil 6 and the power-receiving coil J can be arranged so as to face each other, the restriction member 22 may stop at a location other than the location right above the power-transmitting coil 6.

When the movement of the vehicle M to the storage space S is finished, the control device 7 of the automated parking facility P outputs control instructions to the power-supplying circuit, and starts supplying AC power to the power-transmitting coil 6. The vehicle M controls the power-receiving circuit while monitoring the charged state of the battery, and properly charges the battery. As a result of this charging process, when the charge of the battery is completed, the vehicle M outputs charging completion signals which indicate this state, through a wireless communication unit or the like (not shown). When the control device 7 of the automated parking facility P receives the charging completion signals through another wireless communication unit or the like (not shown), the control device 7 outputs control signals to the power-supplying circuit, thereby completing supplying electric power to the power-transmitting coil 6.

According to this embodiment, since the wireless power transmission to the vehicle M is performed, the attachment and removal of a power-supplying cable to and from the vehicle M is unnecessary for the power supplying. According to this embodiment, the increase of the wiring of the pallet 2 due to the arrangement of a power-supplying cable on the pallet 2 can be prevented. According to this embodiment, the relative positional relationship between the vehicle support member 21 and the restriction member 22 in the width direction can be adjusted, and the position of the vehicle support member 21 disposed above the power-transmitting coil 6 is adjusted so that the power-receiving coil J of the vehicle M and the power-transmitting coil 6 of the storage space S face each other. Therefore, the efficient wireless power transmission can be performed through the above adjustment, even if the vehicle M stops on the vehicle support member 21 with a positional misalignment at the time of entering the automated parking facility. In addition, according to this embodiment, the relative positional relationship between the vehicle support member 21 and the restriction member 22 in the width direction is returned to the original state thereof each time before the pallet 2 is moved to the entrance area E, and thereby, the positional misalignment between the vehicle support member 21 and the restriction member 22 can be prevented from significantly increasing.

The shape, the combination or the like of each component shown in the above-described embodiment is an example, and additions, omissions, replacements, and other modifications of configurations can be adopted within the scope of and not departing from the gist of the present invention. The present invention is not limited to the above embodiment and is limited only by the scopes of the attached claims. For example, the following modifications are also included in the present invention.

(1) In this embodiment, the ball screw unit 3 and the motor 4 are used for an adjustment device, but the present invention is not limited to this configuration. For example, a conventional screw may be used instead of the ball screw unit 3. In addition, a hydraulic cylinder, jack or the like may be used for the adjustment device instead of the ball screw unit 3 and the motor 4, and thereby the relative positional relationship between the vehicle support member 21 and the restriction member 22 may be adjusted. In a case where the relative position therebetween can be adjusted by providing the hydraulic cylinder or the like in the vehicle support member 21 or in the restriction member 22, the motor 4 or the like used for a drive device need not be provided in the positional adjustment area H. Furthermore, as a drive device, a hydraulic motor, an air motor or the like may be used instead of the motor 4 being an electric motor.

(2) In this embodiment, in order to move the vehicle support member 21 in the width direction with respect to the restriction member 22, the female screw portion 31 is fixed to a side of the pair of short edges of the vehicle support member 21, and the male screw portion 32 is attached to a side of the pair of short edges of the restriction member 22, but the present invention is not limited to this configuration. For example, in a case where the vehicle support member 21 is moved in the length direction thereof with respect to the restriction member 22, the female screw portion 31 may be fixed to a side of the pair of long edges of the vehicle support member 21, and the male screw portion 32 may be attached to a side of the pair of long edges of the restriction member 22.

If the female screw portion 31 and the male screw portion 32 are along the short edges or along the long edges of the vehicle support member 21 and of the restriction member 22, the female screw portion 31 and the male screw portion 32 may be provided closer to the centers than the side of the vehicle support member 21 and of the restriction member 22. In a case where the vehicle support member 21 and the restriction member 22 can moves parallel to each other by connecting them using a guide rail or the like, the ball screw unit 3 (adjustment device) may be provided only in one edge thereof. In this case, the ball screw unit 3 is provided in a position avoiding the magnetic flux transparent portions of the vehicle support member 21 and of the restriction member 22.

In a case where the vehicle support member 21 is moved in both the length and width directions thereof with respect to the restriction member 22, an intermediate member is provided between the vehicle support member 21 and the restriction member 22, a female screw portion used for movement in the length direction is fixed to a side of a long edge of the vehicle support member 21, and a male screw portion used for movement in the length direction is fixed to a side of a long edge of the intermediate member. In addition, a female screw portion used for movement in the width direction is fixed to a side of a short edge of the intermediate member, and a male screw portion used for movement in the width direction is fixed to a side of a short edge of the restriction member 22. Accordingly, the relative positional relationship between the vehicle support member 21 and the restriction member 22 in the horizontal direction can be adjusted in both the length and width directions thereof. In this case, two motors 4 are provided therein (two pairs of motors), one is used for movement in the length direction and the other for the movement in the width direction. A ball screw unit used for movement in the width direction may be provided between the vehicle support member 21 and the intermediate member, and a ball screw unit used for movement in the length direction may be provided between the intermediate member and the restriction member 22. A positional misalignment can be reduced in both the long-edge and short-edge directions, and thus, the driver can stop the vehicle M without caring a positional misalignment thereof when mounting the vehicle M on the pallet 2 in the entrance area E.

The female screw portion 31 and the male screw portion 32 may be swapped in this embodiment. That is, the female screw portion 31 may be provided in the restriction member 22, and the male screw portion 32 may be provided in the vehicle support member 21.

In this embodiment, the motor 4 and the male screw portion 32 are disposed on the same axis in the positional adjustment area H. However, if a spur gear or a bevel gear is used which is provided in the restriction member 22 or the like, the motor 4 and the male screw portion 32 can be arranged so as not to be disposed on the same axis, or be arranged so that the axial directions thereof are different from each other.

(3) In this embodiment, an imager or a light sensor is used for the power-receiving coil detector 5, but the present invention is not limited to this configuration. For example, a second power-transmitting coil is provided on the floor h1 of the positional adjustment area H, the second power-transmitting coil transmits electric power to the power-receiving coil J of the vehicle M, and the vehicle M calculates the received power value. The power-supplying circuit calculates the supplied power value of electric power supplied to the second power-transmitting coil. The control device 7 calculates the power transmission efficiency of the wireless power transmission using the received power value data received through a wireless communication or the like from the vehicle M and using the supplied power value data obtained from the power-supplying circuit, and may control the adjustment device based on the power transmission efficiency. In the control method by the control device 7, for example, the positional adjustment is determined to be completed when the power transmission efficiency exceeds a predetermined threshold value.

The positional adjustment of the vehicle support member 21 with respect to the restriction member 22 may be performed in each storage space S, without providing the positional adjustment area H in the automated parking facility P. That is, it is possible to perform the positional adjustment using the power-transmitting coil 6 and the power-receiving coil J before starting the power supplying to the battery of the vehicle M. The power-transmitting coil 6 transmits electric power to the power-receiving coil J of the vehicle M, the vehicle M calculates the received power value, and the power-supplying circuit calculates the supplied power value of electric power supplied to the power-transmitting coil 6. The control device 7 calculates the power transmission efficiency of the wireless power transmission using the received power value data obtained from the vehicle M and using the supplied power value data obtained from the power-supplying circuit, and may control the adjustment device based on the power transmission efficiency. The power transmission efficiency can be obtained by dividing the received power value by the supplied power value. In this case, it is necessary to provide the motor 4 or the like, as a drive device, in each storage space S, or it is necessary to provide, in the pallet 2, a drive device which drives the ball screw unit 3.

(4) In this embodiment, the vehicle support member 21 is a plate-shaped member, but the present invention is not limited to this configuration. For example, if the vehicle M can be mounted thereon, the vehicle support member 21 may be composed of rails on which tires or wheels of a vehicle are placed. If the restriction member 22 can stop at a predetermined position above the power-transmitting coil 6, the restriction member 22 is not limited to a plate-shaped member.

(5) In this embodiment, the power-transmitting coil 6 is provided in all the storage spaces S of the vehicle storage rack 1, and the power supplying can be performed at all the storage spaces S, but the present invention is not limited to this configuration. It is sufficient to provide the power-transmitting coil 6 in part of the storage spaces S, and to selectively move the vehicle M, for which the driver has requested the charging, from the entrance area E to the storage space S provided with the power-transmitting coil 6 for charging. A plurality of positional adjustment areas H may be provided therein. One space (area) may have both functions of the positional adjustment area H and of the storage space S provided with the power-transmitting coil 6.

(6) In this embodiment, the openings 21a and 22a are provided in the metal pallet 2 in order to improve the power transmission efficiency, but the present invention is not limited to this configuration. For example, if the pallet is formed of a resin material or the like having a high rigidity and low magnetic permeability, it is possible to improve the power transmission efficiency without providing any opening.

(7) In this embodiment, as a method to perform the wireless power transmission, the magnetic resonance method is employed, but the electromagnetic induction method may be employed.

(8) The power-transmitting coil 6 and the power-receiving coil J are not limited to helical coils. If the wireless power transmission can be perform between the power-transmitting coil 6 and the power-receiving coil J, coils having other types or shapes such as a solenoid type may be employed. The types, shapes or sizes of both coils may be different from each other.

In this embodiment, if coils having different properties in the front-and-rear direction and in the right-and-left direction are used for the power-transmitting coil 6 and the power-receiving coil J, it is possible to arrange them so that the efficiency of the wireless power transmission does not easily deteriorate even when the relative position between the power-transmitting coil 6 and the power-receiving coil J is changed in the long-edge direction of the pallet 2 (in the back-and-forth of the vehicle M). Accordingly, the allowable range, within which the driver adjusts and stops the vehicle at the time of entrance, in the front-and-rear direction is increased, and thus the burden of the driver is decreased.

(9) A plurality of storage spaces S may include power-transmitting coils 6 having different types, shape or sizes, and a plurality of vehicles M may include power-receiving coils J having different types, shape or sizes. In this case, the wireless power transmission may be performed only between a particular power-transmitting coil 6 and a particular power-receiving coil J. For example, a configuration may be adopted in which the wireless power transmission can be performed between a power-transmitting coil 6*a* and a power-receiving coil Ja, between a power-transmitting coil 6*b* and a power-receiving coil Jb, or between a power-transmitting coil 6*c* and a power-receiving coil Jc, and in which the wireless power transmission cannot be performed in other combinations.

The invention claimed is:

1. An automated parking facility conveying a vehicle to a storage space and storing the vehicle in the storage space, the automated parking facility comprising:
    a power-transmitting coil provided on a floor of the storage space, and performing wireless power transmission to a power-receiving coil provided on a bottom of the vehicle;
    a vehicle support portion allowing the vehicle to be mounted on the vehicle support portion;
    a movable portion, supporting the vehicle support portion such that the vehicle support portion is movable relative to the movable portion, configured to move together with the vehicle support portion to a position facing the power-transmitting coil in the storage space, and configured to stop at a position above the power-transmitting coil in the storage space;
    an adjustment device configured to adjust a position of the vehicle support portion in a horizontal direction with respect to the movable portion; and
    a controller configured to control the adjustment device, and configured to perform support portion positional adjustment in which the position of the vehicle support portion is adjusted with respect to the movable portion so that the power-receiving coil and the power-transmitting coil have a positional relationship suitable for the wireless power transmission.

2. The automated parking facility according to claim 1, further comprising:
    a positional adjustment area allowing the movable portion together with the vehicle support portion to move to the positional adjustment area,
    wherein the adjustment device is provided in the positional adjustment area, and
    the controller is configured to perform the support portion positional adjustment when the movable portion and the vehicle support portion with the vehicle being mounted are located at the positional adjustment area, before the movable portion and the vehicle support portion move to the storage space.

3. The automated parking facility according to claim 2, wherein the positional adjustment area is provided with a power-receiving coil detector detecting a position of the power-receiving coil, and
    the controller is configured to perform the support portion positional adjustment based on a detection result of the power-receiving coil detector.

4. The automated parking facility according to claim 2, wherein the controller is configured to return the position of the vehicle support portion in the horizontal direction with respect to the movable portion to an original state by controlling the adjustment device, when the movable portion and the vehicle support portion are located at the positional adjustment area, before the vehicle is mounted on the vehicle support portion.

5. The automated parking facility according to claim 2, wherein a second power-transmitting coil is provided on a floor of the positional adjustment area in order to perform wireless power transmission to the power-receiving coil, and
    the controller is configured to perform the support portion positional adjustment based on a power-transmitting efficiency of the wireless power transmission between the power-receiving coil and the second power-transmitting coil when the movable portion and the vehicle support portion with the vehicle being mounted are located at the positional adjustment area.

6. The automated parking facility according to claim 1, wherein the controller is configured to return the position of the vehicle support portion in the horizontal direction with respect to the movable portion to an original state by controlling the adjustment device, before the vehicle is mounted on the vehicle support portion and the movable portion.

7. The automated parking facility according to claim 1, wherein the controller is configured to perform the support portion positional adjustment based on a power-transmitting efficiency of the wireless power transmission between the power-receiving coil and the power-transmitting coil when the movable portion and the vehicle support portion with the vehicle being mounted are located at the storage space.

8. The automated parking facility according to claim 1, wherein the adjustment device includes a screw unit including a female screw portion and a male screw portion screwed to the female screw portion; and a drive device driving the screw unit,
    the female screw portion is provided in one of the vehicle support portion and the movable portion, and
    the male screw portion is rotatably provided in the other of the vehicle support portion and the movable portion.

9. The automated parking facility according to claim 1, wherein each of the vehicle support portion and the movable portion includes a magnetic flux transparent portion allowing magnetic flux to penetrate through the magnetic flux transparent portion, the magnetic flux being between the power-receiving coil and the power-transmitting coil during the wireless power transmission.

10. The automated parking facility according to claim 9, wherein size in the horizontal direction of the magnetic flux transparent portion of the vehicle support portion is set to be greater than size in the horizontal direction of the power-receiving coil.

* * * * *